United States Patent Office 3,501,972
Patented Mar. 24, 1970

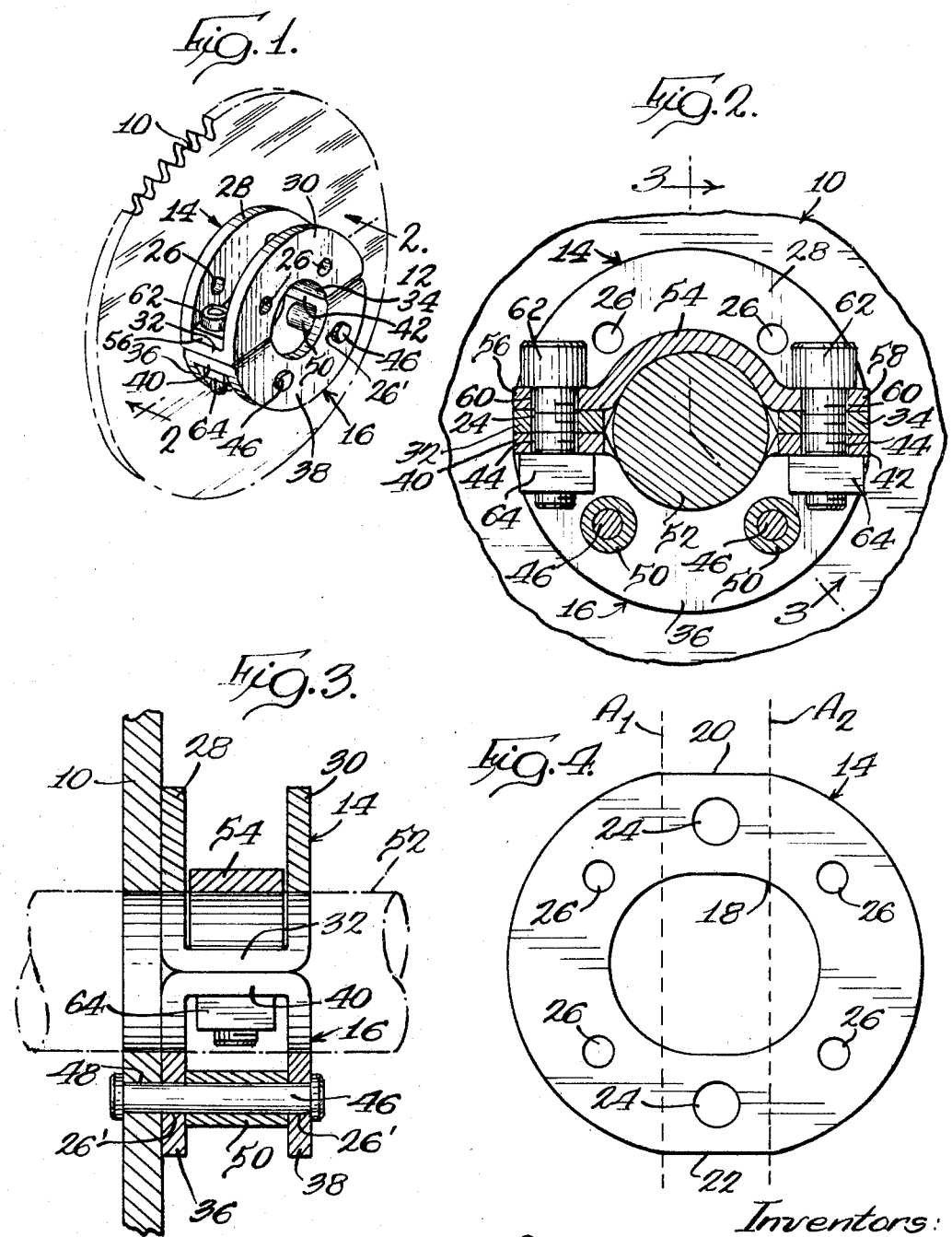

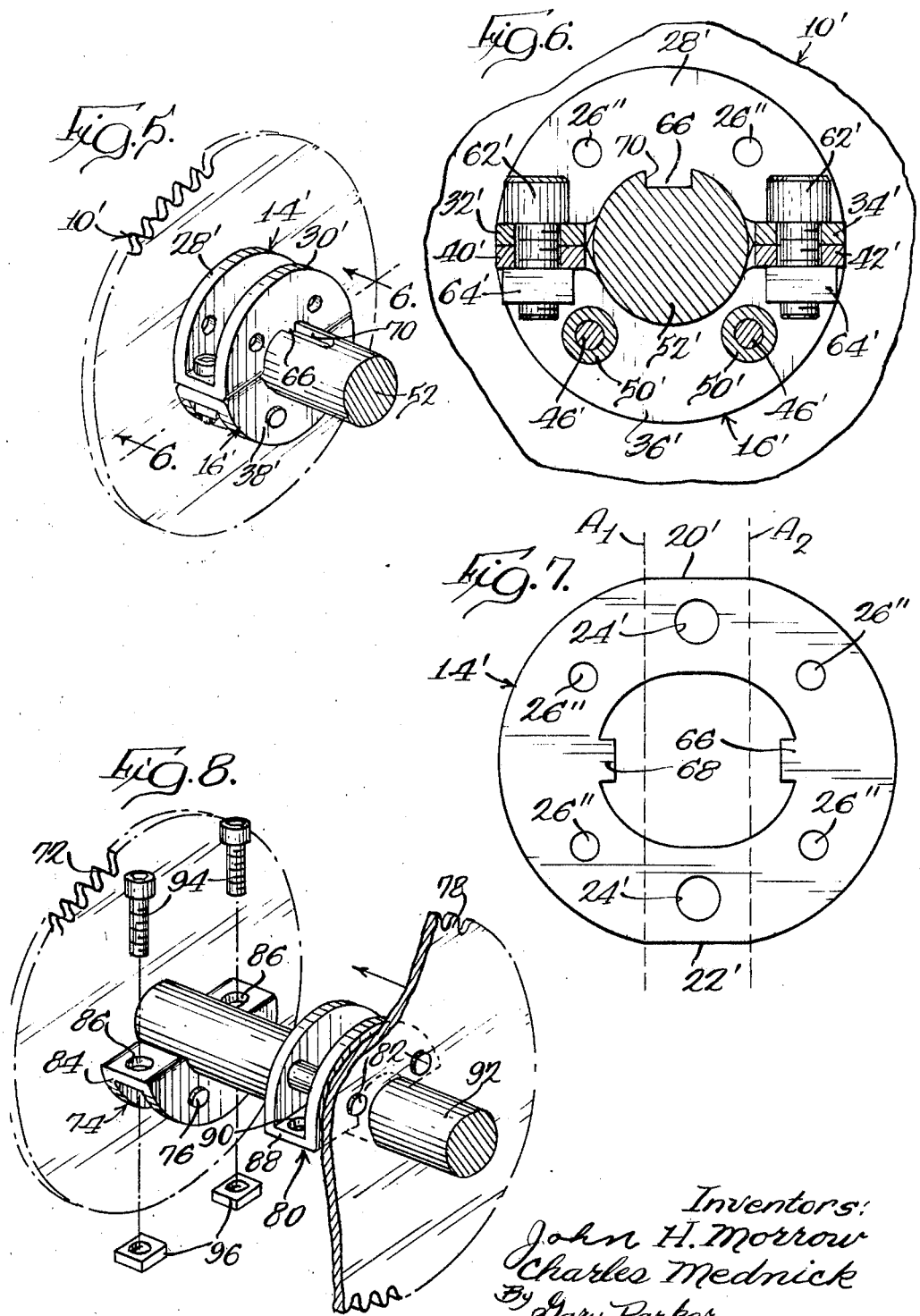

3,501,972
HUB FOR CHAIN SPROCKET OR THE LIKE
John H. Morrow, Oak Lawn, and Charles Mednick, Posen, Ill., assignors to Magnacraft Manufacturing Company, Chicago, Ill., a co-partnership
Filed Mar. 26, 1968, Ser. No. 716,135
Int. Cl. F16h 55/30; B60b 27/06
U.S. Cl. 74—243                    10 Claims

ABSTRACT OF THE DISCLOSURE

An improved hub member for use with a chain sprocket or the like for fixedly mounting the latter on a shaft, the hub including a pair of stampings each of which is formed to comprise one-half of the hub member, one of the hub half portions being permanently affixed to the sprocket member by rivets or other suitable means and the other hub half portion being releasably secured to the first hub half portion by screws or the like whereby the two hub half portions are clamped on a shaft in order to fixedly mount the sprocket thereon.

BRIEF SUMMARY OF THE INVENTION

The present invention relates to an improved hub design for use in mounting a chain sprocket or the like to a shaft for conjoint rotation therewith. Heretofore, there have been two principal hub designs which are normally used for the purpose of mounting a chain sprocket or the like to a shaft. In accordance with one conventional practice a sprocket member and a hub member are machined from a single block of material so as to be integral with one another. The hub is generally cylindrical and has a bore formed therein which extends through the sprocket to receive the shaft on which the sprocket is to be mounted, and the hub is provided with radial set screws or the like to affix the integral hub and sprocket to the shaft.

In accordance with a second known design the hub is formed in two half portions which taken together define a cylindrical hub body with a bore formed therein to accommodate the shaft on which the hub and a corsponding sprocket are to be mounted. One half of the hub is welded to a side of the sprocket, and the other half of the hub is clamped over the shaft and releasably connected to the first half of the hub by a plurality of screws or the like.

The foregoing conventional hub designs are subject to various disadvantages. Thus, both of the foregoing hub designs are expensive to construct, and whether the hub is integral with the sprocket or comprises a hub segment which is welded to the sprocket, the hub itself comprises a machined part. Relative to the split hub design where one-half of the hub is welded to the sprocket, the welding operation produces warping of the sprocket thus requiring a subsequent straightening operation. Moreover, with either of the two above-mentioned known designs, if a key is desired then it is necessary to broach a keyway in the bore of the hub member and secure a key therein by screws or the like.

It is therefore a general object of the present invention to provide an improved hub design and hub and sprocket assembly which eliminate the above-mentioned disadvantages of known hub designs and also are less expensive and simpler to manufacture.

Another object of our invention is to provide a sprocket hub made in two split hub sections each of which comprises a stamping, one of the hub sections being permanently connected to a sprocket or the like and the other hub sections being releasably connectable to the first hub section for clamping about a shaft on which the sprocket is to be mounted.

The foregoing and other objects and advantages of the invention will be apparent from the following description of a preferred embodiment thereof, taken in conjunction with the accompanying drawings.

DESCRIPTION OF THE DRAWINGS

FIGURE 1 is a perspective view of a sprocket and hub assembly constructed in accordance with the present invention;

FIGURE 2 is an enlarged sectional view taken substantially along the line 2—2 of FIGURE 1;

FIGURE 3 is a fragmentary sectional view taken substantially along the line 3—3 of FIGURE 2;

FIGURE 4 is an elevational view of a stamping before the same is bent to form one-half of a split hub member in accordance with the present invention;

FIGURE 5 is a perspective view of a modified sprocket and hub assembly mounted on a shaft, the shaft having a keyway formed therein, and one of the split hub sections having a integral key formed thereon which projects into the keyway to positively lock the hub to the shaft for conjoint rotation therewith;

FIGURE 6 is a sectional view taken substantially along the line 6—6 of FIGURE 5;

FIGURE 7 is an elevational view of a stamping of a type having two key projections formed thereon, the stamping being shown before the same is bent to form one-half of a split hub member; and FIGURE 8 is a perspective exploded view showing the manner in which two sprockets may be mounted in side-by-side relation on a common shaft in accordance with the present invention.

Now, in order to acquaint those skilled in the art with the manner of making and using our invention, we shall describe, in conjunction with the accompanying drawings, certain preferred embodiments of the invention.

DETAILED DESCRIPTION OF THE INVENTION

Referring now to the drawings, FIGURE 1 shows an assembly of a chain sprocket member or the like 10 and a hub member indicated generally at 12, the hub being split so as to comprise two hub half sections 14 and 16. The hub section 14 is made from a flat stamping, preferably made of metal, such as shown in FIGURE 4. It will be seen that the flat stamping 14 of FIGURE 4 is generally oval-shaped in its external contour and has an oval-shaped opening 18 formed in the center thereof. The periphery of the stamping 14 is somewhat flattened at two opposite sides thereof as shown at 20 and 22, and the stamping has punched therein two oppositely disposed holes 24 and four additional holes 26 of a somewhat smaller diameter.

In order to form a split hub section 14 from the stamping shown in FIGURE 4, the latter is bent approximately along two axes which are indicated in dash lines at $A_1$ and $A_2$ in FIGURE 4. Thus, one side of the stamping is bent upwardly about the axis $A_1$ to form a flange 28 as shown in FIGURE 1, and the opposite side of the stamping is bent upwardly about the axis $A_2$ to form an oppositely disposed parallel flange 30. The resulting split hub section 14 will also include a pair of connecting portions 32 and 34 which interconnect the two parallel flanges 28 and 30. After the flat stamping of FIGURE 4 is bent into the split hub section 14 of FIGURE 1, the two holes 26 in the one flange 28 will be aligned with the corresponding two holes 26 formed in the opposite parallel flange 30.

In the embodiment of FIGURE 1, the second split hub section 16 is substantially identical to the first hub section 14 and is formed in a similar manner from a flat stamping such as shown in FIGURE 4. Thus, the hub section 16 includes a pair of parallel flanges 36 and 38 which are interconnected by a pair of connecting portions 40 and 42, and there are provided two holes 26' in the flange 36 which align with corresponding holes 26' in the opposite flange 38. In addition, the connecting portions 40 and 42 have holes 44 formed therein similar to the holes 24 formed in the first hub section 14.

In accordance with the invention, one of the two split hub sections, for example the section 16 of FIGURES 1 and 3, is permanently affixed to the sprocket member 10. Thus, a pair of straight cylindrical pins or the like 46 are passed through the two holes 26' in the flange 38 of the hub section 16 and through the corresponding aligned holes 26' in the parallel flange 36. The two pins project somewhat beyond the outer face of the flange 38 and they also project through a pair of holes 48 (see FIGURE 3) formed in the sprocket 10 so as to project somewhat beyond the rear face of the sprocket. Preferably, a pair of tubular spacers 50 are positioned between the flanges 36 and 38 so that the pins 46 will extend through the spacers as best shown in FIGURE 3. The two ends of each pin 46 are then hammered or crimped so as in effect to rivet the hub section 16 to the sprocket 10. In this manner, the one split hub section 16 is permanently affixed to the sprocket plate 10.

FIGURES 2 and 3 show the manner in which the hub 12 serves to mount the sprocket 10 on a shaft 52. The sprocket 10 is positioned so that the permanently affixed split hub section 16 is engaged against one side of the shaft 52, and the independent hub section 14 is then positioned so as to engage the opposite side of the shaft in opposed relation to the first hub section. While it is not an essential feature to the invention being described, it is desirable to provide an arcuate strap or plate 54 having a pair of end portions 56 and 58 which are bent so as to be coplanar and lie substantially flat against the connecting portions 32 and 34 of the split hub section 14. The end portions 56 and 58 of the strap 54 are provided with holes 60 which align with the holes 24 formed in the connecting portions 32 and 34 of the hub section 14, there being similar holes 44 formed in the connecting portions 40 and 42 of the permanently affixed hub section 16. It will be seen that when positioned as described above the arcuate strap 54 engages around a segment of the periphery of the shaft 52 and increases the area of contact between the hub sections and the shaft.

In order to fixedly secure the foregoing components to the shaft 52, a pair of bolts 62 and nuts 64 are provided. Each bolt 62 passes through an opening 60 in one of the ends portions of the strap 54, and through the two openings 24 and 44 in the connections portions 32 and 40 of the upper and lower hub sections 14 and 16, the bolt having a nut 64 secured on the end thereof. The other bolt 62 similarly passes through an opening 60 in the opposite end of the strap 54 and through openings 24 and 44 in the oppositely disposed connecting portions 34 and 42 of the upper and lower hub sections, the latter bolt also being secured by a nut 64. It will be understood from the foregoing that the hub section 14 and arcuate strap 54 are firmly secured to the opposite hub section 16 so as to clamp the shaft 52 therebetween and thereby removably secure the sprocket plate 10 to the shaft.

FIGURES 5, 6 and 7 show a modified embodiment of the invention which is quite similar to the embodiment of FIGURES 1–4, and thus corresponding parts are identified with corresponding primed numerals. In the embodiment of FIGURES 5–7, one of the two split hub sections 14' is formed with a pair of key projections 66 and 68 which are adapted to project into a keyway 70 formed in the shaft 52'. FIGURE 7 shows the manner in which the flat stamping 14' has the two key projections 66 and 68 formed thereon, whereby when the stamping is bent along the axes $A_1$ and $A_2$ the projections extend radially inwardly in alignment with one another as shown in FIGURES 5 and 6 so as to be received in the keyway 70. In this manner, there is provided a positive locking feature between the hub and the shaft so as to assure rotation of the sprocket 10' conjointly with the shaft 52'. It will be noted that virtually no additional labor or expense is involved in forming the key projections 66 and 68 on the metal stamping 14'. Moreover, it will also be noted that by using a split hub design, it is not necessary to broach the keyway 70 along the entire length of the shaft 52'.

FIGURE 8 shows a further application of the present invention which perimts two sprocket plates to be mounted in side-by-side relation on a common shaft. One sprocket 72 has mounted thereon a split hub section 74 which is similar in its construction to the spilt hub section 16 of FIGURE 1, the hub section 74 being permanently affixed to the sprocket 72 by means of a pair of rivets 76 in the same manner as shown in the embodiment of FIGURES 1 and 3. Similarly, a second sprocket member 78 has mounted thereon a split hub section 80 which is permanently affixed to the sprocket by means of a pair of rivets 82.

The hub section 74 includes a flange connecting portion 84 having a pair of holes 86 formed therein, while the hub section 80 includes a flange connection portion 88 having a pair of holes 90 formed therein. It will be understood that the two sprockets 72 and 78 may be arranged relative to one another on a common shaft 92 so that the two connecting portions 84 and 88 lie in flat engagement against one another with the holes 86 and 90 in alignment and with the two hub sections 74 and 80 engaged against opposite sides of the shaft 92 so as to clamp the latter therebetween. The two hub sections 74 and 80 may then be releasably connected by means of bolts 94 and nuts 96, the bolts being passed through the holes 86 and 90. In this manner, the two sprockets 72 and 78 may be affixed to the shaft 92 in side-by-side relation with the use of only two split hub sections, i.e., the same number of hub sections normally required to mount a single sprocket member on a shaft.

The hub design of the present invention offers important advantages over the conventional hub designs discussed earlier herein because in accordance with the present invention the hub may be formed from metal stampings and thus need not comprise machined parts. In addition, no welding operations are reqided to connect the hub to a sprocket plate. In accordance with the present invention, it is also a simple matter to provide key projections on the stamping which will project radially inwardly into a keyway formed in a mounting shaft. It is normally preferred to form the key on the free hub section rather than the one which is permanently affixed to the sprocket plate, thereby avoiding the need for having a keyway which extends the full length of the mounting shaft.

In the manufacture of a hub and sprocket assembly according to the present invention, a stamping is made such as shown in FIGURE 4 with the various holes punched therein, the central opening 18 being made somewhat undersize. The hub section is then formed by bending the stamping along the axes $A_1$ and $A_2$, and one of the split hub sections is riveted to the sprocket plate. The assembled sprocket plate and split hub section may be mounted on a lathe which is used to bore a center hole in the sprocket plate and at the same time finish the opening 18 in the hub section thereby assuring perfect alignment between the two holes. In this connection, it is to be noted that the stamping operation will impart a slight concavity to the sprocket plate. Consequently, when mounting the sprocket against a lathe face plate for the boring operation, it is desirable to position the concave surface against the face of the lathe face plate, whereby for the boring operation the outside rim of the sprocket plate will engage against the lathe face plate thereby assuring that the bored center hole is square relative to the plane of the sprocket plate. The present design is substantially lighter in weight, less expensive and simpler to manufacture than the various hub designs heretofore known.

We claim:
1. In an assembly of a sprocket or the like and hub means for mounting the sprocket on a shaft for conjoint rotation therewith, the improvement comprising, in comprising, in combination, a sprocket member, a pair of split hub sections, each of said hub sections being in the form of a generally plate-like member which has a central opening and which is bent to form a substantially hollow split hub section having an arcuate portion for engaging against one side of a shaft member, a first one said split hub sections being permanently affixed to said sprocket member, and means releasably connecting the other of said split hub sections to said first hub section so as to clamp a shaft member therebetween thereby fixedly mounting said sprocket on said shaft member.

2. The invention of claim 1 where one of said plate-like member has a key projection thereon, said key projection being located so that said key projection will extend radially inwardly for cooperation with a keyway formed in said shaft member.

3. The invention of claim 1 where said plate-like member is bent along two substantially parallel axes to form a pair of oppositely disposed substantially parallel flange portions, the radially inner edges of said flange portions defining arcuate surfaces for engaging against one side of said shaft member.

4. The invention of claim 3 where said pair of substantially parallel flange portions are interconnected by two generally coplanar spaced apart connection portions, the connecting portions of one split hub section being located so as to lie in closely adjacent parallel relation relative to the connecting portions of an oppositely disposed split hub section when two hub sections are mounted on opposite sides of said shaft.

5. The invention of claim 1 where said first one of said split hub sections is riveted to said sprocket member so as to be permanently attached thereto.

6. In an assembly of a sprocket or the like and hub means for mounting the sprocket on a shaft for conjoint rotation therewith, the improvement comprising, in combination a sprocket member a pair of split hub sections each of said hub sections being in the form of a substantially flat metal plate having a central opening therein with generally semicircular end portions, said plate having a pair of oppositely disposed substantially parallel flange portions interconnected by a pair of spaced generally coplanar connecting portions, the semi-circular radially inner edges of said flange portions defining surfaces for engaging against one side of a shaft member, a first one of said split hub sections being permanently affixed to said sprocket member, and means releasably connecting the other of said split hub sections to said first hub section so as to clamp said shaft member therebetween thereby fixedly mounting said sprocket on said shaft member.

7. The invention of claim 6 where one of said metal plates has a key projection thereon said key projection being located at one of the semi-circular end portions of said central opening so that said flat metal plate forms a split hub section with said key projection extending radially inwardly in cooperation with a keyway in said shaft member.

8. The invention of claim 6 where said first one of said split hub sections is riveted to said sprocket member so as to be permanently attached thereto.

9. The invention of claim 8 where a plurality of rivets are provided which extend through both of said parallel flange portions and through said sprocket member.

10. The invention of claim 6 where said split hub sections are engaged against opposite sides of said shaft member so that said coplanar connecting portions of one hub section lie in closely adjacent parallel relation to the coplanar connecting portions of the oppositely disposed hub section, and with said releasable connecting means extending through said connecting portions of said hub sections so as to connect said two hub sections together and clamp said shaft therebetween.

References Cited

UNITED STATES PATENTS

| 1,580,780 | 4/1926 | Dixon et al. | 287—52.03 |
| 1,656,935 | 1/1928 | Bahan | 74—230.4 |
| 3,323,815 | 6/1967 | Jennings | 287—52.03 |

JAMES A. WONG, Primary Examiner

U.S. Cl. X.R.

74—230.4; 287—52.03